Jan. 10, 1933.  J. G. DOUGLAS  1,893,764
STEERING GEAR
Filed Sept. 16, 1931   2 Sheets-Sheet 1

INVENTOR.
JOHN GEORGE DOUGLAS.
PER. George Hughes
ATTORNEY.

Jan. 10, 1933.  J. G. DOUGLAS  1,893,764
STEERING GEAR
Filed Sept. 16, 1931   2 Sheets-Sheet 2
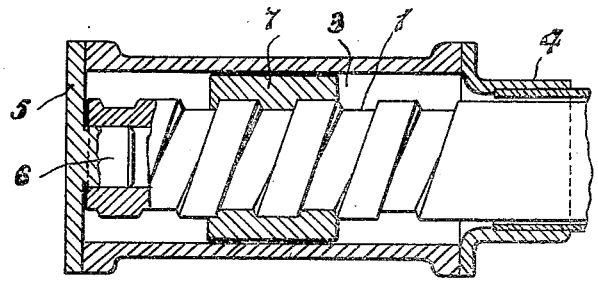
Fig. 4.
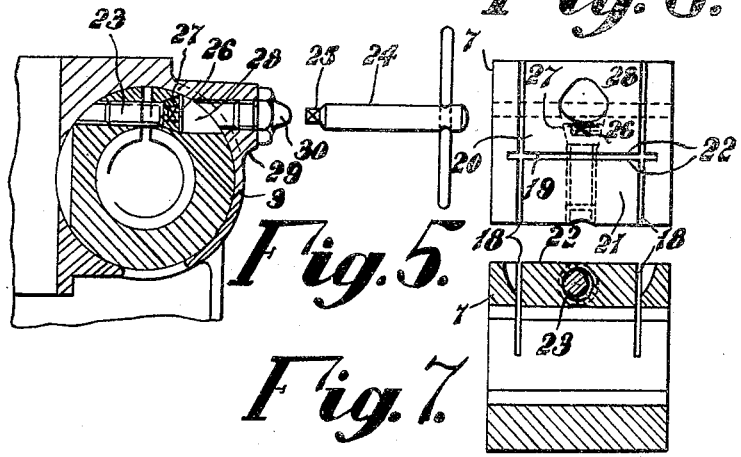
Fig. 5.   Fig. 6.
Fig. 7.
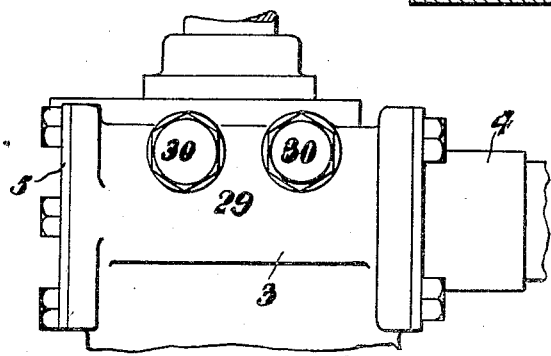
Fig. 8.
INVENTOR.
JOHN GEORGE DOUGLAS.
PER. George Hughes
ATTORNEY.

Patented Jan. 10, 1933

1,893,764

UNITED STATES PATENT OFFICE

JOHN GEORGE DOUGLAS, OF LEAGRAVE, LUTON, ENGLAND

STEERING GEAR

Application filed September 16, 1931, Serial No. 563,142, and in Great Britain February 6, 1931.

My present invention relates to steering gear of motor road vehicles and for other like purposes where it is required to operate dirigible wheels or steering members in a simple and efficient manner. My invention is particularly useful in connection with the steering gear of motor road vehicles. One object of my invention is to enable a simple and highly efficient steering gear to be produced. Another object of my invention is to enhance the efficiency of worm and nut operated rocker-arm types of steering gear.

The normal practice in worm and nut operated rocker-arm steering gear is to connect a steering column to a co-axially worm threaded spindle on which is threaded a nut adapted to be displaced by rotation of the steering column and by reason of its displacement to swing the rocker-arm with which it is engaged. The displacement of the nut obtained solely by rotation of the steering column is the only movement utilized to swing the rocker arm and it necessitates a pin and slot connection with the rocker arm or some such equivalent device to compensate for the arcuate movement of the rocker arm and the straight line movement of the nut. A further object of my invention may be said to simplify this type of steering gear and also to enable an accelerated movement of the rocker arm and therefore the drop arm to be obtained in one direction.

My present invention broadly consists of a rotatable member connected to the road wheels or equivalent dirigible members to impart steering motion thereto, and to a translatably movable member by means of which the rotatable member is rotated, such translatably movable member having a simultaneous movement of translation and rotation imparted to it by the steering gear operating means.

My invention may also be said to comprise a worm and nut steering gear in which the nut connected to the usual rocker arm has imparted to it a rotary motion in addition to a motion of translation, such rotary motion imparting acceleration to the rocker arm in one direction and deceleration in the other direction.

The preferred form of my invention comprises a nut threaded on to an axially rotatable worm spindle and connected to the free end of a rocker arm, such connection to the rocker arm being such that one point of the periphery of the nut is carried along an arcuate path corresponding to that generated by one point of the rocker arm whereby the nut is caused to rotate about the worm spindle during its motion of translation.

In order that my invention may be clearly understood and readily carried into effect, I have appended hereto a sheet of drawings illustrating embodiments thereof and wherein Fig. 1 is a broken side elevation view with a cover cap removed showing the rocker arm and part of the means for operating it.

Fig. 4 is a sectional plan view showing a modified method of supporting the worm spindle at its lower end.

Fig. 5 is a detail sectional end elevation view showing a method of obviating slip between the nut and worm spindle.

Fig. 6 is a side elevation view of the nut shown in Fig. 5.

Fig. 7 is a sectional elevation of the said nut, and

Fig. 8 is a broken side elevation view of Fig. 5.

Figure 1:
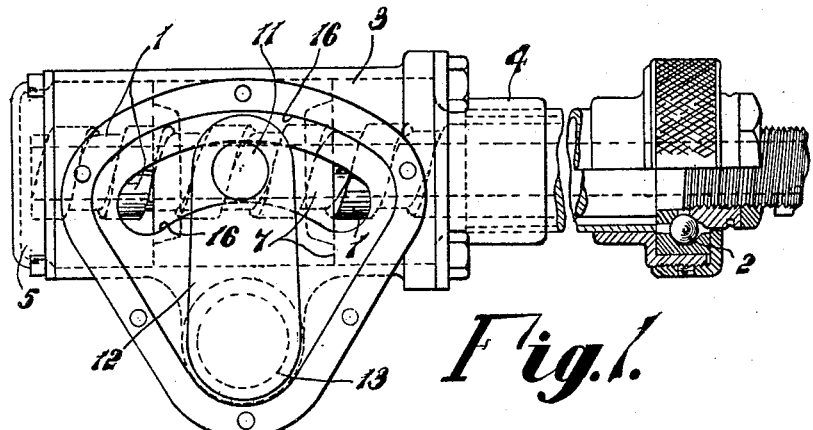

Referring to the drawings the steering column is fixed by any suitable means to a worm spindle 1, any suitable form of bearing 2 being provided to take the thrust arising during steering operations. A cylindrical housing 3 accommodates the worm spindle 1 and is closed at its upper end by a flanged boss 4, the lower end being closed by a cap 5 which as shown in Fig. 4 may if desired be formed with a concentric integral locating boss 6 engaged in the lower end of the worm spindle 1. The worm spindle 1 has threaded on to it a nut 7 which is preferably formed as a nice sliding fit in the cylindrical housing 3 for which purpose the nut 7 is formed with a cylindrical periphery. The nut 7 is formed with a substantially radial circular section recess 8 preferably lined with a bush 9 in which is engaged a part spherical head 10 of a lateral pin 11 screwed or otherwise secured into the rocker arm 12 mounted on the spindle 13. The drop arm 14 is secured in any suitable manner to the outer end of the spindle 13. The spindle 13 rotates within a sleeve 15 which can be formed integral with the housing 3 and has its axis at right angles to the axis of such housing.

The usual practice is to connect the nut 7 by a pin and slot connection to the rocker arm 12 and to restrain the nut from rotation by suitably splining or otherwise guiding it in the housing 3. The result of such a connection is that in the movement of the rocker arm 12 from its normal or central position a loss in the motion imparted to the rocker arm relative to the movement of the nut takes place, this loss increasing in proportion to the amount of displacement of the nut. But in the present invention the nut has imparted to it not only a movement of translation but also a rotary motion which causes the nut to rotate on the worm spindle 1 as the rocker arm 12 swings about the axis of the spindle 13. This action is readily understood by a consideration of the fact that as there is no lost or relative translative motion between the spherical head 10 of the pin 11 and the nut 7, and as such pin 11 must describe an arcuate path whose radius will equal the radius of the rocker arm 12, this movement being permitted by the arcuate slot 16 formed in one side of the cylindrical member 3, then as the nut is drawn along the spindle 1 and swings the arm 12 the part spherical headed pin 11 also carries the nut 7 rotatably around the worm spindle 1 so that there is acceleration of the rocker arm from its normal position, and deceleration when it returns to its normal position, over and above the translatable movement of the nut 7 caused by rotation of the worm spindle 1.

Figure 3:
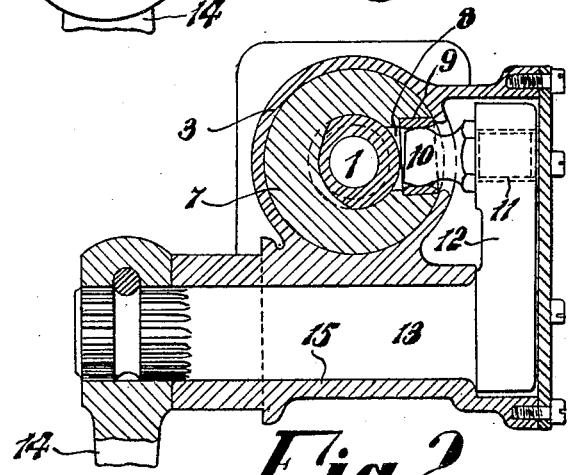
Fig. 3 is a side elevation view somewhat similar to Fig. 4 but showing the radial direction of the rocker arm at an angle to the radial direction of the drop arm.
Figure 2:
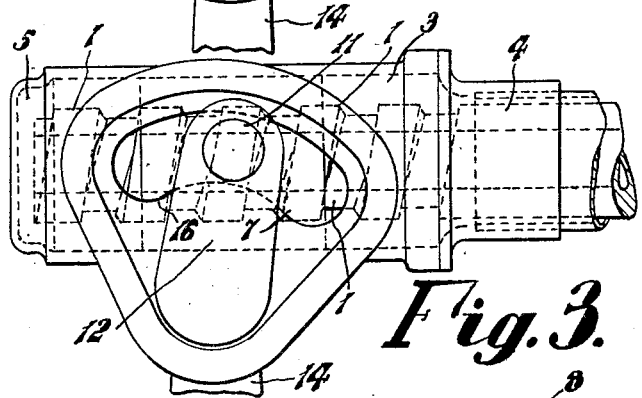
Fig. 2 is a sectional end elevation taken through the rocker arm spindle.

With some steering gear it might be desirable to only have acceleration and deceleration for movement of the rocker arm on one side of its central position and have a comparatively constant movement on the other side. This can be effected by arranging the arcuate path of pin 11 in relation to the axis of the worm spindle 1 shown in Fig. 3, in which the centre of the arcuate path is displaced to one side, the radial direction of the rocker arm 12 relative to the drop arm 14 being correspondingly displaced so that the drop arm 14 and rocker arm 12 form an angle with each other. The arcuate path of pin 11 on one side of the normal or straight driving position of the rocker arm 12 then lies in a path which diverges very little from a direction parallel with the axis of the worm spindle 1, but on the other side considerable rotation of the nut 7 will occur with consequent acceleration of movement of pin 11 and rocker arm 12.

It is desirable in order to obtain the full benefit of my invention to prevent slip or lost motion between the nut 7 and the worm spindle at any part of its travel and this can be effected by making sure that the nut always adequately grips the worm spindle. For this purpose, I split the nut circumferentially by slots 18, these slots extending substantially through a semi-circle and being connected by an intermediate transverse slot 19 which thereby produces two limbs 20 and 21 in the nut, the free ends 22 of which can be drawn together or separated by a screw 23 threaded through such ends and adapted to be engaged at one end by a tool 24 which can be provided with a square end 25 adapted to be engaged in a corresponding recess 26 in a conical head 27 of the screw 23, such conical head rotating in a corresponding seating in a recess 28 in one of the limbs 20, 21. The housing 3 is provided with a boss 29 apertured to receive the tool 24 and normally closed by a screw cap 30.

As shown in Fig. 8, it may be preferred to employ two apertured bosses 29 with appropriate caps 30 to enable the screw 22 to be engaged at two positions of the nut 7, for example the extreme positions of movement of such nut. This adjustment enables wear of the nut to be compensated for.

What I claim is:—

1. In a steering gear a worm shaft, a cylindrical nut threaded on said worm shaft, a housing accommodating the nut, and acting as a bearing for the periphery of said nut, a rocker arm, a radial recess in said nut and a lateral projection on said rocker arm engaged in said radial recess, the nut being rotatable as it is fed along the worm shaft in conformity with the arcuate path of travel of the rocker arm.

2. Steering gear comprising a worm shaft, a cylindrical nut threaded on said worm shaft, a cylindrical housing rotatably supporting and acting as a bearing for the periphery of said nut, a radial socket in said nut, a rocker arm, and a ball headed lateral projection on the outer end of the rocker arm engaged in said socket.

3. Steering gear comprising a worm shaft, a nut threaded on said worm shaft, a cylindrical housing rotatably supporting said nut, a radial socket in said nut, a rocker arm, a ball headed lateral projection on the outer end of the rocker arm engaged in said socket, a spindle rotatable in said housing on an axis transverse to said shaft and carrying said rocker arm at one end and carrying a drop arm at the other end, an arcuate slot in the part of the housing accommodating the nut through which said projection extends into the nut, and a cover plate attached to said housing and enclosing said rocker arm.

4. Steering gear comprising a worm shaft, a cylindrical nut threaded on said worm shaft, a cylindrical housing rotatably supporting and acting as a bearing for said nut, a radial socket in said nut, a rocker arm, a ball headed lateral projection on the outer end of the rocker arm engaged in said socket, circumferential and longitudinal splits in said nut producing in said nut a pair of limbs and a screw passed through the free ends of said limbs to contract them on to the nut.

5. Steering gear comprising a worm shaft, a nut threaded on said worm shaft, a cylindrical housing rotatably supporting said nut, a radial socket in said nut, a rocker arm, a ball headed lateral projection on the outer end of the rocker arm engaged in said socket, a spindle rotatable in said housing on an axis transverse to said shaft and carrying said rocker arm at one end and carrying a drop arm at the other end, an arcuate slot in the part of the housing accommodating the nut through which said projection extends into the nut, a cover plate attached to said housing and enclosing said rocker arm, the radial direction of the rocker arm being formed at an angle to the radial direction of the drop arm, said arcuate slot demarcating from the direction of travel on one side of the normal or central position of said crank and being nearly parallel with said direction of travel on the other side for the purpose set forth.

6. In a steering gear a worm shaft, a nut with a cylindrical periphery threaded on the said shaft and a housing in which said nut slides and rotates axially, said housing forming a contact bearing for the cylindrical periphery of the nut, so that the nut is peripherally supported both for rotation and sliding motion by the housing, a rocker arm connected to the nut, the nut being rotatable as it is fed along the worm shaft in conformity with the arcuate path of travel of the rocker arm.

In witness hereof I have signed this specification.

JOHN GEORGE DOUGLAS.